United States Patent [19]
Rollins et al.

[11] Patent Number: 5,264,119
[45] Date of Patent: Nov. 23, 1993

[54] FILTER CONTAINER FOR POSITIONING, INSTALLATION AND MAINTENANCE WITHIN LIMITED SPACE

[76] Inventors: Stephen M. Rollins; Yannick Real, both of P.O. Box 2560, Gardena, Calif. 90247-0560

[21] Appl. No.: 910,955

[22] Filed: Jul. 9, 1992

[51] Int. Cl.$^5$ .................... B01D 29/96; B01D 35/31; B01D 35/143
[52] U.S. Cl. .................... 210/90; 210/232; 210/236; 210/443; 210/450
[58] Field of Search .......... 210/90, 232, 440, 443, 210/450, 455, 456, 541, 542, 236, 257.2

[56] References Cited

U.S. PATENT DOCUMENTS

| | | | |
|---|---|---|---|
| 2,912,110 | 11/1959 | Stoltenberg | 210/90 |
| 4,283,281 | 8/1981 | Cogan | 210/232 |
| 4,317,726 | 3/1982 | Shepel | 210/236 |
| 4,402,828 | 9/1983 | Edens | 210/443 |
| 4,507,201 | 3/1985 | Wall et al. | 210/232 |
| 5,037,547 | 8/1991 | Burrows | 210/257.2 |
| 5,221,473 | 6/1993 | Burrows | 210/232 |

FOREIGN PATENT DOCUMENTS 2-32503  7/1990  Japan ................................. 210/541

Primary Examiner—Joseph W. Drodge
Attorney, Agent, or Firm—John E. Halamka

[57] ABSTRACT

A filter container arrangement which permits ease of positioning, installation and maintenance within limited space allocable to such a device in applications such as a boat. The head plug being easily removably insertable to provide a large opening for removal and replacement of the filter element after which the head plug may be easily reinserted and the container sealed. The input and output mechanisms, mounted on the port plug, being non-incrementally rotatably and longitudinally adjustable to facilitate alignment of the input and output mechanisms with the input and output sources. A plurality of pressure monitor assembles which may incorporate a bleed valve for each of the input and output sides of the filter are mounted in the head plug to allow the user to determine the status of the filter element without opening the filter container.

17 Claims, 1 Drawing Sheet

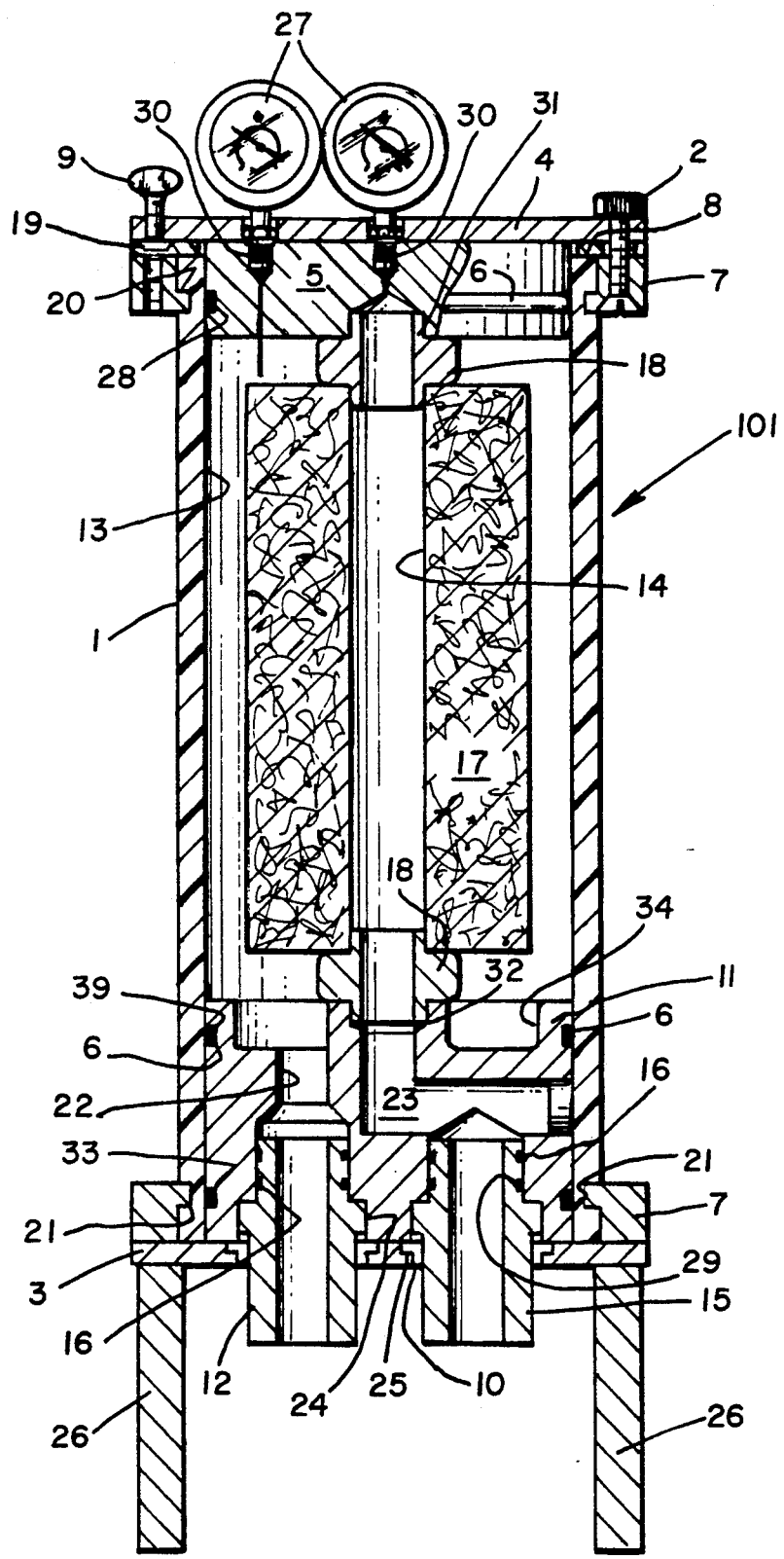

FILTER CONTAINER FOR POSITIONING, INSTALLATION AND MAINTENANCE WITHIN LIMITED SPACE

BACKGROUND OF THE INVENTION

1. Field of the Invention

This invention relates to the potable water art and, more particularly, to an improved filter container for positioning, installation and maintenance within the limited space of boats and ships.

2. Description of the Prior Art

The history of potable water processing onboard boats and ships has provided many prior attempts to solve the problem of installing staged systems along with the required connections between stages within the limited confines of a boat or ship. Initial installation may be simple during construction of the boat or ship. But retro-fitting of older vessels and maintenance of the systems require subsystem elements and the connections there between to be accessible, replaceable and alignable.

U.S. Pat. No. 4,402,828 describes a pressure filter vessel arrangement which utilizes a housing with an end cap at each end. The upper and lower end caps are held within the pressure vessel by external tie rods secured together with nuts on each end. Maintenance service of this configuration is difficult and time consuming. Upon removal of the top nuts to remove the top cap to gain access to the vessel to service the filters, the vessel is free to move off lower cap. The next step of removal of the nuts which hold down the individual filter elements, removal of the multiple filter elements from the vertical pipes, replacement of the filter elements onto the pipes and tightening of the nuts on each element may disturb the alignment of the flow block with the vessel container. The user must reseat the vessel on the lower end cap flow block, insert the top cap and have all four external, vertical tie rods in the proper alignment while equally tightened the nuts to maintain this vertical alignment. If the alignment is lost during this process, the vessel will leak and the user must tear down and try again.

Thus, there has long been a need for a connection arrangement utilizing both rotatable and longitudinal adjustment rather than a non-adjustable, non-positionable simple threaded pipe fitting to a flange or union which may result in a fixed, non-alignment to the orifice of the vessel.

Further, it is also desired that, in order to allow convenient servicing, such as replacement of the filter element, access to the vessel should be placed at a convenient surface and easy to open. The filter element should be easy to remove and replace, and such servicing should not compromise the integrity of the vessel or any existing seals within the vessel. Pressure monitoring should be provided on both sides of the filter.

Further, it is also desired that, in order to allow use in salt water processing systems, that the device be resistant to corrosion.

SUMMARY OF THE INVENTION

Accordingly, it is an object of the present invention to provide an improved pressure vessel for a filter element which allows initial installation or replacement connection to other stages in the system by means of an adjustable connection - being both rotationally and longitudinally adjustable.

It is another object to provide an improved pressure vessel with a convenient lid assembly providing a large opening through which a single filter element may be easily removed and replaced. The lid being easily removed by means of a plurality of thumb screws so that positioning and turning a wrench on a nut in a tight place becomes unnecessary.

It is yet another object to provide the opening with easily removable top cap without disturbance of the bottom cap. Each end cap is to be independent of the other end cap.

It is yet another object to provide pressure monitoring on both sides of the filter all within a corrosion resistant device.

The above and other objects of the present invention are achieved, according to a preferred embodiment thereof, by providing an improved pressure vessel with independent mountings for the top cap and the bottom cap.

The top cap being fitted with two apertures positioned to allow the monitoring of pressure on each side of the filter. The devices mounted in the apertures may also include bleed valves to bleed air, oil or other adverse constituents or provide a separate collection line for filtered and unfiltered product.

In the preferred embodiment, the application of a retaining ring assembly at both the top cap and bottom cap allows for the independent removal of either cap without disrupting the seal or connections to the other cap.

Most of the parts of the device are fabricated of corrosion resistant material such as plastic and may be reinforced with fiberglass to withstand high operating pressures.

BRIEF DESCRIPTION OF THE DRAWINGS

The above and other embodiments of the present invention may be more fully understood from the following detailed description, taken together with the accompanying drawing, wherein similar reference characters refer to similar elements throughout, and in which:

FIG. 1 is a crosssectional drawing of the pressure vessel showing a plane view of the pressure monitors;

DESCRIPTION OF A PREFERRED EMBODIMENT

Referring now to the drawing, there is illustrated in FIG. 1 a sectional view of the prefilter pressure vessel generally designated 101. The preferred embodiment of the inventive device may be installed as one of the initial stages of a marine reverse osmosis water purification system. As such, it may be mounted on a skid which can then be installed within the limited confines of a boat or ship.

The housing 1 of the prefilter pressure vessel 101 is unitarily fabricated in basically a cylindrical shape of plastic material with a preselected inside diameter and outside diameter. Because of the high pressure involved, it is preferred to fabricate the housing 1 with fiberglass reinforcement.

At least one end of the housing 1 should be removably sealable to allow initial set up of the prefilter device and to assist in easy preventive and corrective maintenance. The enclosing of the end of a pressure vessel are well known in the art generally. However, the limited space of ships and boats require special considerations for easy access and servicing of the prefilter device.

In the preferred embodiment depicted in FIG. 1, a top channel 20 is formed in the outside surface of housing 1 near the top. A bottom channel 21 is formed in the outside surface of housing 1 near the bottom.

The top assembly may be fabricated of several pieces. A head plug 5 is formed as a solid cylinder with an outside diameter preselected to be smaller than the inside diameter of the housing 1. A plurality of monitoring assembly mounts 30 is formed in the head plug 5. One of the monitoring assembly mounts 30 is located in the center of the head plug 5 and another may be located near the periphery of the head plug 5. A head plug channel 28 is formed in the outside peripheral surface of the head plug 5. An O ring seal 6 is mounted in the head plug channel 28 so that upon the insertion of the head plug 5 into the housing 1, a non leak seal is formed at the top end of the housing 1.

The head plug 5 is held in place within the housing 1 by the bearing plate 4. The bearing plate 4 may be attached to the head plug 5 by screws to facilitate lifting of the head plug 5 from the top of the housing 1. The bearing plate 4 may be spaced from the top edge of the housing 1 by an annulus 8.

A split ring 7, having a lip formed along the lower inside edge, is engagable with the top channel 20. A plurality of top ring assembly fasteners 2 engages the split ring 7 and bearing plate 4 to hold the head plug within the housing 1 under the condition of internal pressure of up to at least 150 pounds per square inch being applied to the inside of the housing 1. The bearing plate 4 is typically metallic as it does not come into contact with sea water flowing through the pressure vessel 101.

After disengaging the top ring assembly fasteners 2 to allow separation of the bearing plate 4 from the split ring 7, removal of the bearing plate 4 and head plug 5 assembly may be facilitated by mounting a plurality of thumb screws 9 into threaded apertures formed in the periphery of the bearing plate 4. As the thumb screws 9 are turned, the tip of the thumb screws 9 push against a plurality of reinforcing surfaces 19 mounted in the upper surface of the annulus 8 and positioned under the thumb screw threaded apertures. The annulus 8 is mounted on the top edge of the housing 1 and may be further attached to the split ring 7 whereby, upon the condition of the removal of the top ring fasteners 2, the split ring 7 will not fall out of the top channel 20.

As the thumb screws 9 are tightened, a force is exerted through the reinforcing surface 19 to the annulus 8 and onto the end surface of the housing 1. Responsive to this force, the head plug 5 is lifted upward and the seal formed by the O ring seal 6 is loosened. Once the head plug 5 is moved upward, the user may complete the removal by grasping the bearing plate 4.

That portion of the annulus ring 8 which is engagable with the tip of the thumb screws 9 is reinforced with a metal reinforcing surface 19 to prevent deterioration. Similarly, the annulus 8 provides a large surface area to push against the top edge of the housing 1 to avoid damaging the housing 1 during removal of the head plug 5.

A top filter support seat 31 is formed as essentially a cylindrical cavity with a preselected inside diameter on the underside of the head plug 5. A similar bottom filter support seat 32 is formed on the upper inside surface of the port plug 11.

A filter support 18 is mounted within each of the filter seats 31 and 32 to be engagable with the filter cartridge 17. In the preferred embodiment, each filter support 18 is glued in place to prevent leaks and displacement of the filter support 18 during maintenance.

The filter cartridge is fabricated in essentially a hollow cylindrical shape with a preselected inside diameter and outside diameter. The hollow inside portion being engagable with the filter supports 18 with an interference fit to form a sealed, second chamber 14 within the prefilter device 101. The outside diameter of the filter cartridge 17 is selected to be smaller than the inside diameter of the housing 1 thereby forming a first chamber 13.

The inlet port mechanism 12 and outlet port mechanism 15 are formed essentially in a cylindrical shape having an upper section of a preselected outside diameter, a middle section of a larger preselected diameter forming a port plug bearing shoulder 24 and a bottom section of a diameter preselected to be smaller than the shoulder 24.

A port plug inlet 22 is formed by machining an essentially cylindrical aperture having a preselected inside diameter within the port plug 11 to communicate the vessel 101 input source with the first chamber 13 in accordance with fluid dynamic laws to minimize friction losses.

A inlet dispersion channel 34 is formed in the upper surface of the port plug 11 resulting in minimal line loss.

A port plug outlet 23 is formed by machining an essentially cylindrical aperture having a preselected inside diameter and route within the port plug 11 to communicate the second chamber 14 with the output source of the vessel 101 in accordance with fluid dynamic laws to minimize friction losses.

The ends of the port plug inlet 22 and the port plug outlet 23 remote from the first and second chambers, 13 and 14, are formed to receive the port mechanisms 12 and 15. The most remote portion being formed of a preselected larger inside diameter to accommodate the port plug bearing shoulder 24 formed on each mechanism, the length of this most remote portion being longer than the port plug bearing shoulder 24 to allow longitudinal positioning of each port mechanism within the respective inlet 22 and outlet 23.

Each port mechanism is fabricated with a plurality of port channels 29. A port O ring seal 16 is mounted in each port channel 29 forming a seal between the port mechanism and the port plug 11 even during rotational movement of the port mechanism within the port plug 11.

The unique configuration of the port mechanisms 12 and 15 allows independent rotational and longitudinal adjustment of each port within the port plug 11 during installation and operation of the prefilter. This is an invaluable feature under the condition of connecting the vessel 101 in a hard plumbed manifold environment. Vibration, settling, or movement of system segments connected to the vessel 101 will not affect the function or seal of the vessel 101. Vessel 101 is uniquely adapted to be connect in series or parallel because of the design of the port mechanisms 12 and 15.

Pre-filtration is obtained by forcing the affluent with external pressure up to 150 pounds per square inch through the filter cartridge 17. Effluent, so filtered, is gathered in the effluent chamber 14 and forced to exit through the port plug 11 into the outlet port mechanism 15 and off to the next stage of the process.

A plurality of port plug channels 33 are formed in the outside cylindrical surface of the port plug 11. An O ring seal 6 is mounted in each channel 33. Upon the insertion of the port plug 11 into the housing 1, the 0 ring seals 6 create a leak proof seal.

The port plug 11 is contained within the pressure vessel 101 by the bottom support assembly 3.

In a manner similar to that used for the head plug 5, a split ring 7 having a lip engagable with the bottom channel 21, is attached to the bottom support assembly 3. Two apertures are formed in the bottom support assembly 3, each having a diameter larger than the outside diameter of the port plug bearing shoulder 24. Each aperture is formed with a step 25 so as to hold a split annulus retaining ring 10 in place to assist in holding each port mechanism in alignment.

A plurality of legs 26 may be attached to the bottom support assembly 3 to allow clearance of the input and output sources as connected to the port mechanisms.

The legs 26 may be formed to allow the entire pressure vessel 101 to be attached to a pallet or a preselected vessel surface.

A plurality of monitor assemblies 27 are attached to the head plug 5 by means of a monitor assembly mount 30. The mounts include a channel to communicate at least one chamber to the monitor assembly 27.

In the preferred embodiment, a monitor assembly 27 communicates with the first chamber 13 and another monitor assembly communicates with the second chamber 14. Each monitor assembly 27 contains a pressure gage to indicate the pressure in each chamber. From these readings, a differential pressure may be ascertained and aggregated over time. This history of differential pressure will allow an assessment of the condition of the filter cartridge 17. Thus, a preferred maintenance plan may be utilized based upon the actual condition of the filter cartridge 17 rather than simply time in service.

Each monitor assembly 27 may incorporate a bleed valve to bleed air, oil or other undesirable contaminants. Further, this bleed valve may be utilized to obtain samples of the contents of each chamber for analysis or collection of desirable products.

Fluid movement is obtained through pressure from the inlet port 12 forcing affluent to flow through the filter cartridge 17 and out the outlet port 15. Designation of inlet port and outlet port is arbitrary as the affluent may flow in either direction through the prefilter pressure vessel 101.

Since certain change may be made in the above apparatus without departing from the scope of the invention herein involved, it is intended that all matter contained in the above description, as shown in the accompanying drawing, shall be interpreted in an illustrative, and not a limiting sense.

What is claimed is:

1. An improved filter container arrangement adapted for positioning, installation and maintenance within limited space to an inlet source and an outlet source, and comprising, in combination:
   a unitarily fabricated housing having a hollow cylindrical shape with open ends, a head plug and a port plug enclosing said open ends;
   seal means between said head plug and said housing;
   seal means between said port plug and said housing;
   mounting means for removably attaching said head plug to said housing whereby said head plug is removable insertable into said housing within said limited space while re-establishing the ability of said seal means for said head plug to withstand a preselected internal pressure of said container without leaking under the conditions of assembly by the user and application of a preselected pressure;
   mounting means for attaching said port plug to said housing whereby said port plug is secured in place to withstand a preselected internal pressure of said container without leaking;
   sealable inlet port means adapted to allow independent rotational and longitudinal positioning of said inlet port means to mate with said inlet source yet maintain an inlet seal under the conditions of assembly by the user and application of a preselected pressure;
   sealable outlet port means adapted to allow independent rotational and longitudinal positioning of said outlet port means to mate with said outlet source yet maintain an outlet seal under the conditions of assembly by the user and application of a preselected pressure; and,
   a filter element mounted between said input port and said output port forming a first chamber and a second chamber.

2. The arrangement defined in claim 1 wherein:
   said housing is reinforce with fiberglass.

3. The arrangement defined in claim 1 further comprising a plurality of legs mounted to said mounting means for said port plug.

4. The arrangement defined in claim 1 further comprising:
   a plurality of monitor assembly mounts at least one communicating with said first chamber and another communicating with said second chamber;
   a monitor assembly mounted in each said monitor assembly mounts having a pressure indicator responsive to at least the pressure of said chamber to which said monitor assembly mount communicates.

5. The arrangement defined in claim 1 further comprising a inlet dispersion channel formed in said port plug and communicating with said input source and said second chamber.

6. An improved filter container arrangement adapted for positioning, installation and maintenance within limited space to an inlet source and an outlet source, and comprising, in combination:
   a unitarily fabricated housing having a hollow cylindrical shape with open ends, a head plug and a port plug enclosing said open ends;
   seal means between said head plug and said housing;
   seal means between said port plug and said housing;
   mounting means for removably attaching said head plug to said housing whereby said head plug is removably insertable into said housing within said limited space while re-establishing the ability of said seal means for said head plug to withstand a preselected internal pressure of said container without leaking under the conditions of assembly by the user and application of a preselected pressure;
   mounting means for attaching said port plug to said housing whereby said port plug is secured in place to withstand a preselected internal pressure of said container without leaking:
   sealable inlet port means adapted to allow independent rotational and longitudinal positioning of said inlet port means to mate with said inlet source yet maintain an inlet seal under the conditions of assembly by the user and application of a preselected pressure;

sealable outlet port means adapted to allow independent rotational and longitudinal positioning of said outlet port means to mate with said outlet source yet maintain an outlet seal under the conditions of assembly by the user and application of a preselected pressure;

a filter element mounted between said input port and said output port forming a first chamber and a second chamber;

a plurality of thumb screws mounted in said mounting means for said head plug; and, a reinforcing surface mounted in said mounting means for said head plug opposite the tip of each said thumb screws whereby the user may tighten said thumb screws to exhort force to break the seal between said head plug and said housing and remove said head plug upon the condition of said mounting means for said head plug being disengaged.

7. The arrangement defined in claim 6 wherein: said housing is reinforce with fiberglass.

8. The arrangement defined in claim 6 further comprising a plurality of legs mounted to said mounting means for said port plug.

9. The arrangement defined in claim 6 further comprising:

a plurality of monitor assembly mounts at least one communicating with said first chamber and another communicating with said second chamber;

a plurality of monitor assemblies mounted in each said monitor assembly mounts having a pressure indicator responsive to the pressure of said chamber.

10. The arrangement defined in claim 6 further comprising a inlet dispersion channel formed in said port plug and communicating with said input source and said second chamber.

11. An improved filter container arrangement adapted for positioning, installation and maintenance within limited space to an inlet source and an outlet source, and comprising, in combination:

a unitarily fabricated housing having a hollow cylindrical shape with open ends and an outside surface, a head plug and a port plug each having an outside surface insertable into said housing enclosing said open ends;

a plurality of plug channels formed in said outside surface of said head plug and in said outside surface of said port plug;

O rings mounted in each said plug channels to form sealed container;

a top channel formed in said outside surface of said housing a preselected distance from one end of said housing;

a bottom channel formed in said outside surface of said housing a preselected distance from the other end of said housing;

at least said head plug being removably insertable into one of said open ends of said housing and held in place by a bearing plate;

a split ring having an upper and a lower edge and having a lip formed in the inside surface of said split ring along said lower edge, said lip engagable with said top channel, and mounted parallel to said bearing plate;

an annulus mounted between said split ring and said bearing plate;

a plurality of top ring assembly fasteners hold said annulus between said split ring and said bearing plate;

a plurality of filter supports having first end and a second end, at least one said filter support first end sealably engagable with said head plug and another said filter support having a first end sealably engagable with said port plug;

a filter cartridge sealably engagable with said second end of said filter supports forming a first chamber and a second chamber within said housing;

said port plug having an inlet with a preselected inside diameter communicating with said second chamber and an outlet with a preselected inside diameter communicating with said first chamber;

an inlet port mechanism basically cylindrical in shape, with a preselected outside diameter smaller than the inside diameter of said port plug inlet, a preselected portion of which is mounted within said port plug inlet and having;

a preselected portion adjacent said portion mounted within said inlet port plug having a larger outside diameter forming a shoulder;

a plurality of inlet port channels formed in the outside surface of said inlet port above said shoulder;

O rings mounted in each said inlet port channels forming a seal whereby said inlet port mechanism may be rotated and moved longitudinally to conform to the position of said inlet source;

an outlet port mechanism basically cylindrical in shape, with a preselected outside diameter smaller than the inside diameter of said port plug outlet, a preselected portion of which is mounted within said port plug outlet and having;

a preselected portion adjacent said portion mounted within said outlet port plug having a larger outside diameter forming a shoulder;

a plurality of outlet port channels formed in the outside surface of said outlet port above said shoulder;

O rings mounted in each said output port channels forming a seal whereby said output port mechanism may be rotated and moved longitudinally to conform to the position of said outlet source;

said port plug being held in place by a bottom support assembly having an plurality of apertures of a preselected diameter larger than the outside diameter of said port mechanisms; and, a split ring having an upper and a lower edge and having a lip formed in the inside surface of said split ring along said upper edge, said lip engagable with said bottom channel, and said split ring mounted to said bottom support assembly.

12. The arrangement defined in claim 11 wherein: said housing is reinforced with fiberglass.

13. The arrangement defined in claim 11 further comprising a plurality of legs mounted to said bottom support assembly.

14. The arrangement defined in claim 11 further comprising:

a plurality of monitor assembly mounts at least one communicating with said first chamber and another communicating with said second chamber;

a monitor assembly mounted in each said monitor assembly mounts having a pressure indicator responsive to at least the pressure of said chamber to which said monitor assembly mount communicates.

15. The arrangement defined in claim 11 further comprising:
   a plurality of thumb screws mounted in said bearing plate;
   a reinforcing surface mounted in said annulus opposite the tip of each said thumb screws whereby the user may tighten said thumb screws to exhort force to break seal between said head plug and said housing and said remove head plug upon the condition of said top ring assembly fasteners being disengaged.

16. The arrangement defined in claim 11 further comprising a split annulus retaining ring mounted in each and every said aperture of said bottom support assembly thereby providing alignment of said port mechanisms within said port plug and whereby the user may remove said port mechanisms for maintenance of said O rings.

17. The arrangement defined in claim 11 further comprising a inlet dispersion channel formed in said port plug and communicating with said input source and said second chamber.

* * * * *